United States Patent
Bristol et al.

(10) Patent No.: US 7,033,133 B2
(45) Date of Patent: Apr. 25, 2006

(54) AIR TURBINE STARTER HAVING A LOW DIFFERENTIAL CHECK VALVE

(75) Inventors: Brent L. Bristol, Phoenix, AZ (US);
Louie T. Gaines, Phoenix, AZ (US);
Donald J. Christensen, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 194 days.

(21) Appl. No.: 10/732,935

(22) Filed: Dec. 10, 2003

(65) Prior Publication Data

US 2005/0139019 A1   Jun. 30, 2005

(51) Int. Cl.
*F01D 25/15* (2006.01)
*F16K 15/00* (2006.01)

(52) U.S. Cl. .................. 415/110; 137/517; 137/519; 137/843

(58) Field of Classification Search ............... 137/466, 137/519.5, 517, 843; 415/110
See application file for complete search history.

(56) References Cited

U.S. PATENT DOCUMENTS

| 387,961 A | 8/1888 | Ryan |
|---|---|---|
| 530,442 A | 12/1894 | Munger |
| 719,654 A | 2/1903 | Ewing |
| 1,536,127 A | 5/1925 | Newton |
| 1,897,492 A * | 2/1933 | Ledoux ............... 137/433 |
| 2,372,456 A | 3/1945 | Stewart |
| 2,833,093 A * | 5/1958 | Shesler ............... 451/430 |
| 3,036,592 A | 5/1962 | Lips |
| 3,085,591 A | 4/1963 | Schneider |
| 3,170,292 A | 2/1965 | Howes et al. |
| 3,245,669 A | 4/1966 | Huggins et al. |
| 3,457,948 A | 7/1969 | Niedemayer |
| 3,472,024 A | 10/1969 | Strub et al. |
| 3,811,470 A | 5/1974 | Schaefer |
| 3,924,708 A | 12/1975 | Dabrowka |
| 3,941,145 A | 3/1976 | Morain et al. |
| 4,046,222 A | 9/1977 | Skrivanek et al. |
| 4,077,202 A | 3/1978 | Schutze |
| 4,100,935 A | 7/1978 | Harnish |
| 4,383,549 A | 5/1983 | Maldavs |
| 4,525,995 A | 7/1985 | Clark |
| 4,605,039 A | 8/1986 | Johnson et al. |
| 4,638,835 A | 1/1987 | Chuang |
| 4,779,413 A | 10/1988 | Mouton |
| 4,825,897 A | 5/1989 | Shade |
| 4,944,327 A | 7/1990 | Gyben |
| 4,960,085 A | 10/1990 | Coons |
| 4,986,310 A * | 1/1991 | Bailey et al. ............... 137/859 |
| 5,042,963 A | 8/1991 | Sorenson et al. |

(Continued)

*Primary Examiner*—Edward K. Look
*Assistant Examiner*—Richard A. Edgar
(74) *Attorney, Agent, or Firm*—Ingrassia Fisher & Lorenz

(57) ABSTRACT

An air turbine starter is provided that includes a check valve assembly. The check valve assembly comprises a valve body, a valve seat and a valve element. The valve body includes an inlet port, an outlet port, and a flow passage extending therebetween. The valve seat is coupled to the valve body, extends at least partially into the flow passage and has an opening therethrough. The valve element is disposed within the flow passage between the valve seat and the valve body outlet port. The valve element is also configured to translate axially between an open position and a closed position in response to a pressure differential between the inlet and outlet ports.

21 Claims, 3 Drawing Sheets

U.S. PATENT DOCUMENTS

| | | |
|---|---|---|
| 5,235,812 A | 8/1993 | Klaass et al. |
| 5,249,597 A | 10/1993 | Thomas |
| 5,462,081 A | 10/1995 | Perusek et al. |
| 5,636,848 A | 6/1997 | November |
| 5,911,678 A | 6/1999 | White |
| 5,927,561 A * | 7/1999 | Foster et al. ............. 222/321.9 |
| 5,941,532 A | 8/1999 | Flaherty et al. |
| 5,979,488 A | 11/1999 | Smith et al. |
| 6,004,037 A | 12/1999 | Harris et al. |
| 6,263,912 B1 | 7/2001 | Brown et al. |
| 6,378,293 B1 | 4/2002 | Care et al. |
| 6,681,579 B1 * | 1/2004 | Lane et al. ................... 60/787 |
| 2003/0059294 A1 | 3/2003 | Olsen |
| 2003/0145602 A1 | 8/2003 | Lane et al. |

* cited by examiner

AIR TURBINE STARTER HAVING A LOW DIFFERENTIAL CHECK VALVE

FIELD OF THE INVENTION

The present invention relates to an air turbine starter, and more particularly, an air turbine starter having a low pressure differential check valve.

BACKGROUND OF THE INVENTION

An air turbine starter (ATS) is typically used to start an aircraft turbine engine, for example, a gas turbine jet engine. The ATS is typically mounted to the jet engine through a gearbox or other transmission assembly and a cover plate or wall is located between the starter and gearbox housings. The gearbox transfers power from the ATS to the engine to start the engine.

Many air turbine starters typically include lubrication to run properly. Some air turbine starters use an assisted wet cavity design (AWC) to assist in lubrication. These designs include a turbine starter housing having a mounting face or mounting flange that is sealingly engaged with, and coupled to, the gearbox such that a porting system, that allows free transfer of lubricating oil between the gearbox and the starter, is defined. Each port in the porting system is typically in fluid communication with passages within the starter housing so that oil can be distributed within the starter, and are located in portions of the starter-gearbox assembly such that they act as sump passages or oil return passages.

Typically in AWC designs, air flows freely between the starter and the gearbox. The gearbox may be pressurized or nonpressurized. In a non-pressurized gearbox design, the gearbox pressure may be about 0.1–0.3 psi above ambient pressure. At times, the starter housing may become punctured, causing a breach in the starter structure and a change in pressure. In such case, the starter pressure may drop to equalize with ambient pressure. Consequently, in the case of the non-pressurized design, the pressure differential between the gearbox and starter may be about 0.1 to 0.3 psi. Though this pressure differential may be relatively small, excessive oil may still leak from the gearbox to the starter and, consequently, out through the breach. Generally, in such an event, a check or reed valve is used to counteract the oil loss. However, because the pressure differential between the starter and gearbox is small, it has been found that these valve types may not work consistently.

Accordingly, there is a need for an aircraft turbine starter with improved fluid flow control in the condition of starter housing puncture. Additionally, there is a need for an air turbine starter with the ability to operate during starter housing breach, and in particular, in instances when the breach causes a low pressure differential between the starter and gearbox. Furthermore, other desirable features and characteristics of the present invention will become apparent from the subsequent detailed description of the invention and the appended claims, taken in conjunction with the accompanying drawings and this background of the invention.

SUMMARY OF THE INVENTION

The present invention provides an air turbine starter including a starter housing and a check valve. The starter housing is adapted to couple to a gearbox assembly, and includes an opening configured to provide fluid communication between the gearbox assembly and the starter housing. The check valve assembly is disposed within the opening and includes a valve body, a valve seat, and a valve element. The valve body has an inlet port, an outlet port, and a flow passage therebetween. The valve seat is coupled to the valve body and extends at least partially into the flow passage. The valve seat also includes an opening therethrough. The valve element is disposed within the flow passage between the valve seat and the valve body outlet port and is configured to translate axially between an open position and a closed position in response to a pressure differential between the inlet and outlet ports.

In another embodiment, and by way of example only, a check valve assembly having a valve body, an valve seat, and a valve element is provided. The valve body has an inlet port, an outlet port, and a flow passage therebetween. The valve seat is coupled to the valve body and extends at least partially into the flow passage. The valve seat includes an opening therethrough. The valve element is disposed within the flow passage between the valve seat and the valve body outlet port and is configured to translate axially between an open position and a closed position in response to a pressure differential between the inlet and outlet ports.

In yet another embodiment, a check valve assembly comprising a backing plate, a cage, a valve seat and a valve element is provided. The backing plate includes an outlet port. The cage is coupled to the backing plate and has an inlet port. A flow passage extends between the inlet port and the outlet port. The valve seat is coupled to the backing plate, and extends at least partially into the flow passage and further includes an opening therethrough. The valve element is disposed within the flow passage between the valve seat and the inlet port, and is configured to translate axially between an open position and a closed position in response to a pressure differential between the inlet and outlet ports.

Other independent features and advantages of the preferred air turbine starter will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it should be appreciated that the present invention is not limited to use in conjunction with a specific type of rotating machine. Thus, although the present invention is, for convenience of explanation, depicted and described as being implemented in a turbine starter, it should be appreciated that it can be implemented in numerous other machines including, but not limited to, a gas turbine engine, a hydraulic pump, a water pump, or various other chemical and industrial pumps.

Figure 1:
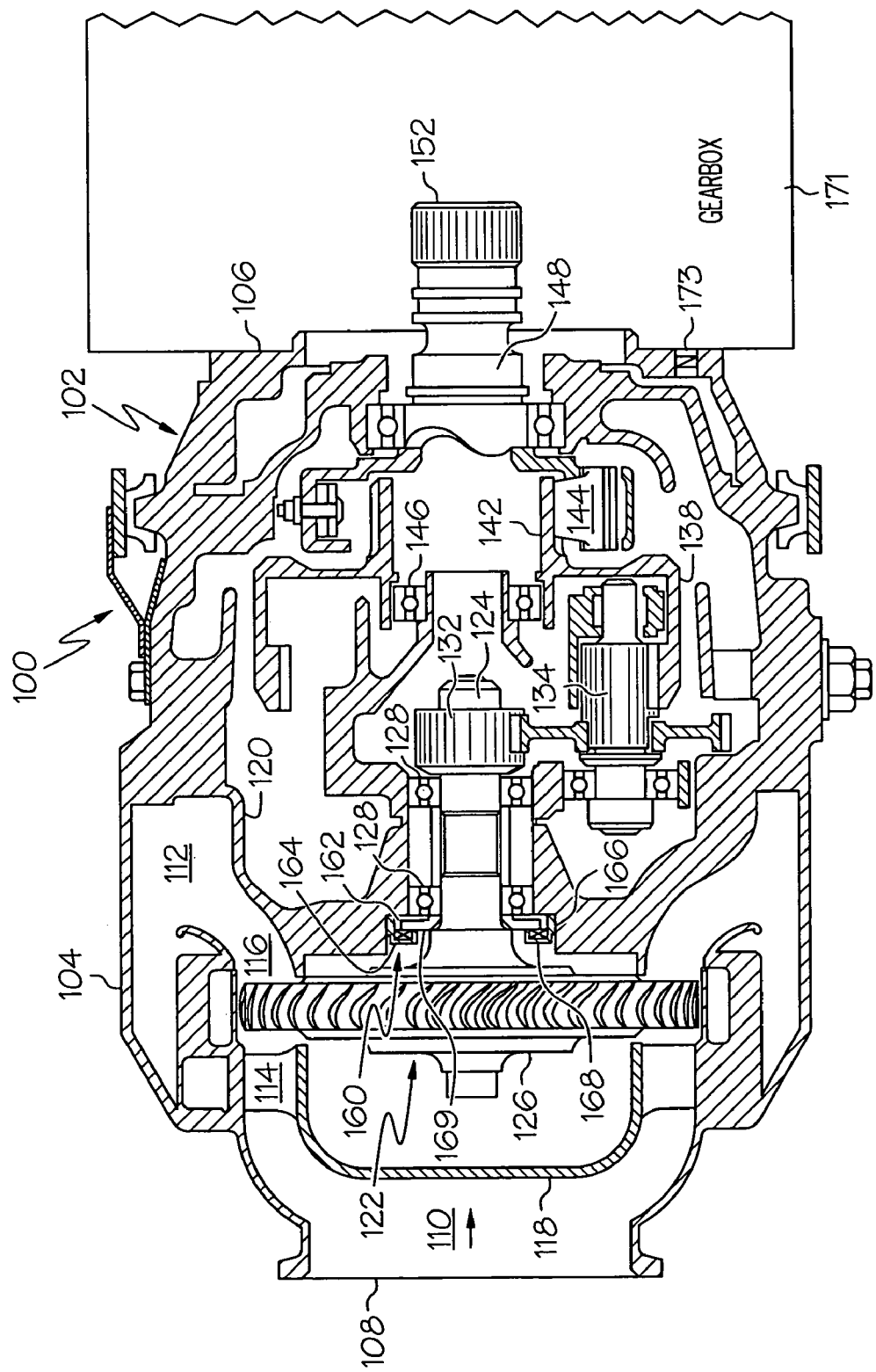
FIG. 1 is a cross sectional view of an air turbine starter (ATS) that may use an exemplary embodiment of the seal assembly.

Turning now to the description, a cross sectional view of an exemplary air turbine starter (ATS) that is used to initiate the rotation of a larger turbine, such as a turbofan jet engine, is depicted in FIG. 1. The ATS 100 is enclosed within a housing assembly 102 that includes at least a turbine section 104 and an output section 106. The housing assembly 102 may be made up of two or more parts that are combined together or may be integrally formed as a single piece. The housing assembly 102 includes an inlet plenum 108, which directs compressed air into the housing assembly 102. The compressed air received at the plenum 108 flows through an annular flow channel 110 and out a radial outlet port 112. The annular flow channel 110 includes an axial flow portion 114 and a substantially curved radial flow portion 116. The axial flow portion 114 is formed through a stator assembly 118 that is mounted within the housing assembly turbine section 104 proximate the inlet plenum 108. The radial flow portion 116, which flares the annular flow channel 110 radially outwardly, is formed between a portion of the housing assembly turbine section 104 and an exhaust housing 120 that is mounted within the housing assembly 102.

A turbine wheel 122 is rotationally mounted within the housing assembly turbine section 104. In particular, the turbine wheel 122 has an output shaft 124 that extends from a hub 126, through the exhaust housing 120, and into the housing assembly output section 106. The turbine wheel output shaft 124 is rotationally mounted in the housing assembly output section 106 by bearing assemblies 128. A gear 132 is coupled to the turbine wheel output shaft 124, and meshes with a compound planetary gear train 134. The compound planetary gear train 134 engages a ring gear 138 and a hub gear 142, which is in turn coupled to an overrunning clutch 144. During operation of the ATS 100, this gearing configuration converts the high speed, low torque output of the turbine wheel output shaft 124 into low speed, high torque input for the overrunning clutch 144.

The overrunning clutch 144, as noted above, is coupled to the hub gear 142, which is supported by another bearing assembly 146. A drive shaft 148 extends from the overrunning clutch 144, through the turbine housing output section 106, and is coupled to a turbine output shaft 152. The output shaft 152 is, in turn, coupled to the turbofan jet engine gearbox 171.

The gearbox 171 typically includes a plurality of passages (not shown) through which oil freely passes to supply lubrication to the gearbox 171 components. The passages are in fluid communication with oil flow passages within the turbine housing assembly output section 106 via openings 174 (shown in FIG. 2). Preferably, the check valve assembly 173 operates according to a pressure differential existing between the interior portion of the gearbox 171 and the interior of the ATS 100. Thus, the openings 174 are selectively opened or closed by a check valve assembly 173 depending on the pressure differential. Check valve assembly 173 is preferably placed adjacent or within an opening 174 formed within the starter housing 102, as shown more clearly in FIG. 2.

Turning back to FIG. 1, lubricating oil is sealed within the ATS assembly 100 via a face seal assembly 160. Specifically, the face seal assembly 160 provides a fluid tight seal between the rotating turbine wheel 122 and the oil held inside of the housing assembly turbine section 104 and the housing assembly output section 106. The face seal assembly 160 includes a rotor 162, and a stator seal assembly 164 that includes a seal case 166 and a seal stator ring 168. The rotor 162 is mounted on the turbine wheel output shaft 124, and has an axially facing flange 169 that extends radially outwardly away from the turbine wheel output shaft 124. The seal case 166 is mounted to the exhaust housing 120 and surrounds the turbine wheel output shaft 124. The seal stator ring 168 is housed within the seal case 166 and sealingly engages the axially facing flange 169 of the rotor 162, providing the fluid tight seal between the rotating turbine wheel output shaft 124 and the oil held inside of the turbine housing 104 and output 106 sections. Though not explicitly depicted, it should be appreciated that another face seal assembly 160 may also be included in the ATS 100 that seals the turbine output shaft 152.

Figure 2:
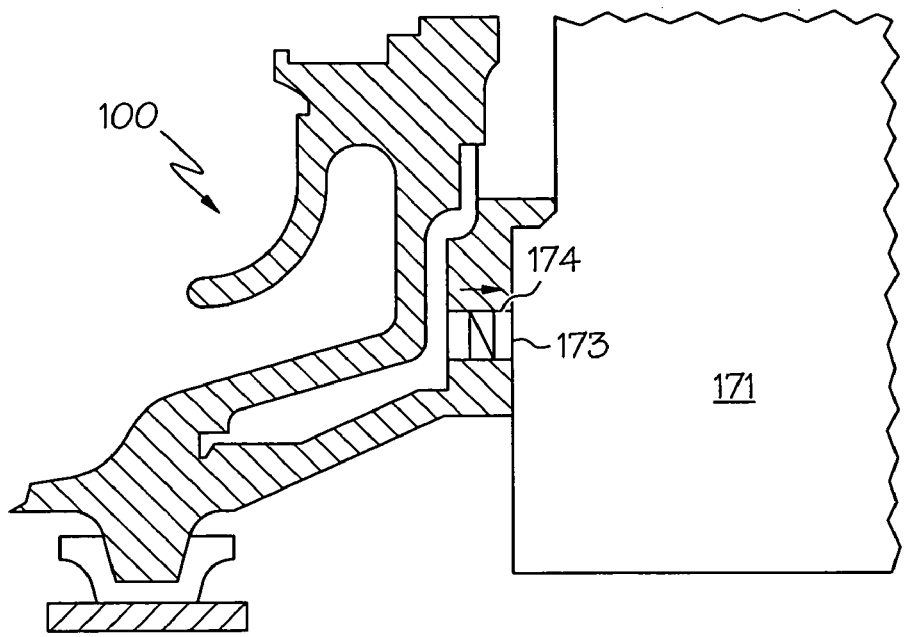
FIG. 2 is a detail and cutaway view of a portion of the air turbine starter of FIG. 1 including an exemplary embodiment of the seal assembly.

FIG. 2 illustrates a detail and cutaway view of a portion of the starter 100 of FIG. 1 including a check valve assembly 173 according to an exemplary embodiment. The opening 174 vents between the ATS 100 and the gearbox 171 and, as mentioned previously, allows the ATS 100 to be serviced with lubricating oil from gearbox 171. The opening 174 is generally configured to receive the check valve assembly 173 such as through threaded engagement, bayonet mount or other mounting methods. Alternatively, the opening 174 can be configured to close around and accept the check valve assembly 173. The opening 174 is shown to be positioned towards the outer periphery of the ATS housing 102; however, as will be appreciated by those skilled in the art, the openings can be located at any position to allow venting between the ATS 100 and the gearbox 171. For instance, the ATS housing 102 may include additional walls or cover plates that may cover certain ATS components within which openings may be formed. Thus, the check valve assembly 173 can be placed in or over a wall or cover plate opening that may be mounted on the ATS housing 102. Moreover, although the illustration depicts one opening 174, more than one opening 174 between the ATS 100 and gearbox 171 may be employed. In the case of more than one opening 174, either the same number of check valve assemblies 173 or a check valve assembly used in conjunction with other valve assemblies will typically be employed.

Figure 3:
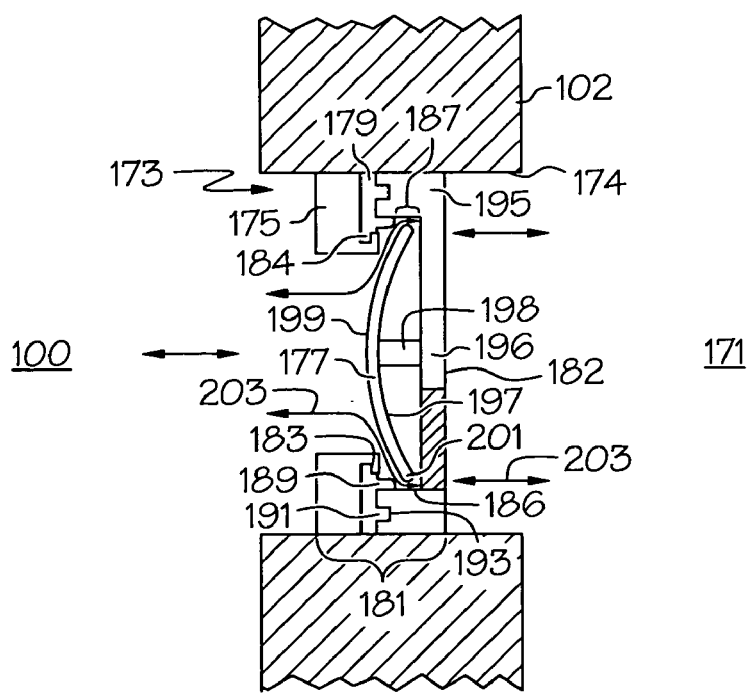
FIG. 3 is a cross section view of the portion of the starter housing including an exemplary embodiment of the seal assembly under normal operating conditions.
Figure 4:
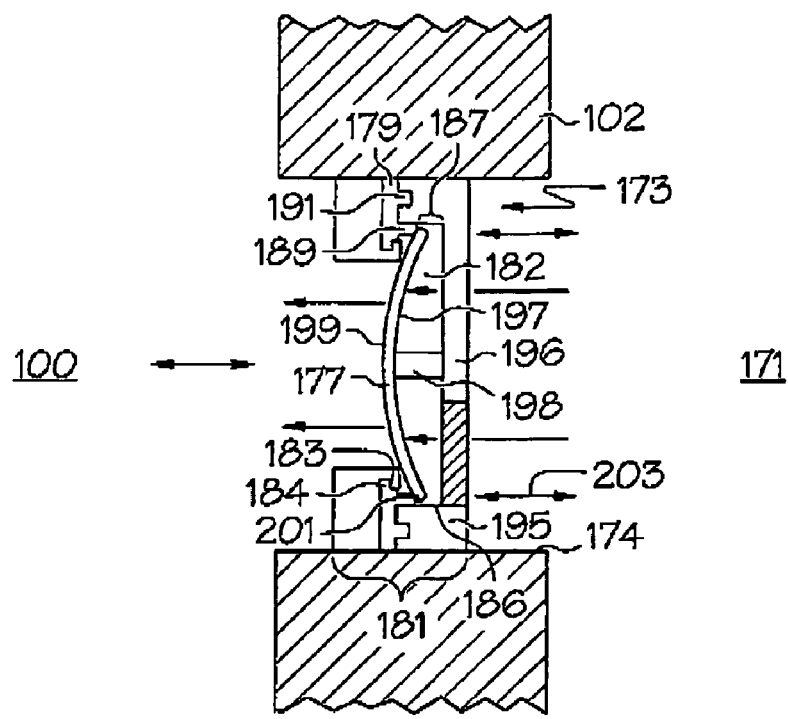
FIG. 4 is a detailed cross section view of the portion of the starter housing including an exemplary embodiment of the seal assembly under an ATS breach condition.
Figure 5:
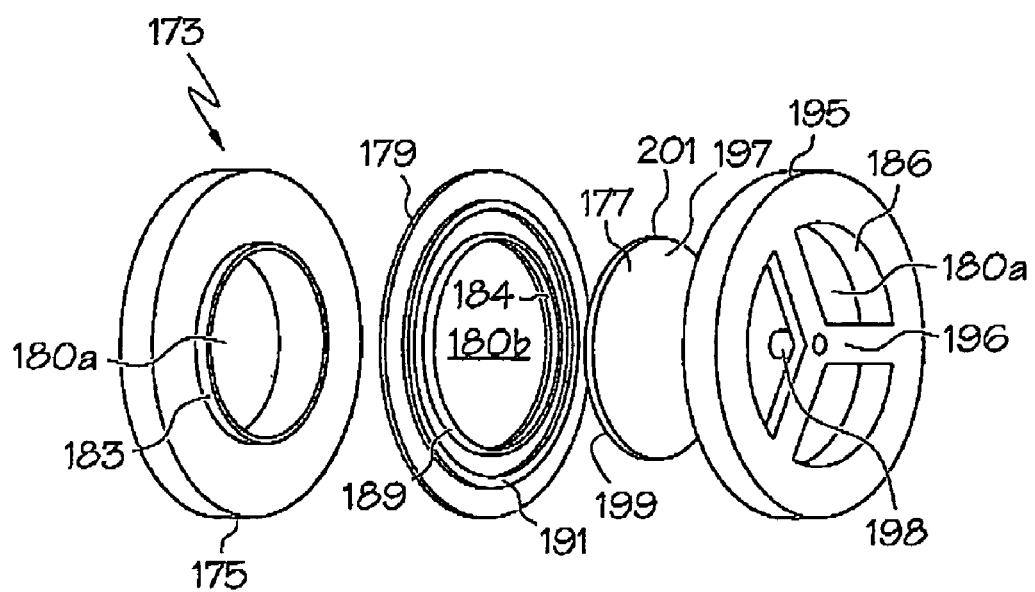
FIG. 5 is an exploded view of the seal assembly according to an exemplary embodiment.

Turning to FIGS. 3–5, detailed, close up views of the check valve assembly 173 are provided. FIGS. 3 and 4 illustrate the valve assembly 173 disposed within the opening 174. FIG. 5 is an exploded view of the valve assembly 173 illustrated in FIGS. 3 and 4. The check valve assembly 173 is normally open under normal operating conditions for the ATS 100 and the gearbox 171. The check valve assembly 173 is preferably placed within or adjacent an opening 174 of the starter housing, for example, between the ATS 100 and the gearbox 171.

The check valve assembly 173 includes a valve body 181, a valve element 177, and a valve seat 179. The valve element 177 is preferably held between the valve seat 179 and valve body 181 to allow the valve element 177 to translate axially between an open and closed position in response to a pressure differential that may be present between the ATS 100 and the gearbox 171. Each of the valve assembly 173 components will now be discussed.

The valve seat 179 and valve body 181 are generally ring-shaped and each include through channels 180a, 180b that each comprise part of a flow passage 182 allowing fluid communication between the ATS 100 and gearbox 171 oil passages. The valve body 181 is preferably a two-piece assembly that includes a backing plate 175 and a cage 195 coupled together and configured to hold the valve seat 179 in place. To this end, located along the inner periphery of the backing plate 175 is a coupling portion 183 used to couple the valve seat 179 to the plate 175. In this embodiment, the coupling portion 183 is an annular flange formed on the plate 175, however, as will be appreciated, the coupling portion 183 may also be configured in any other manner so as to couple the valve seat 179 and plate 175 together. The valve seat inner periphery 184 fits under the annular flange 183 and aids in anchoring the valve seat 179 to the plate 175. The valve seat is preferably elastomeric, but, it will be appreciated that the valve seat may be one of numerous other configurations, such as smoothly ground. The valve seat 179 further includes two concentric annular protrusions 189, 191 formed thereon and that protrude therefrom. The protrusions 189, 191 are spaced apart so as to be able to accept and sealingly couple to the cage 195. A groove 193 formed on the underside of the cage 195 sealingly couples with the outer annular protrusion 191. As a result, the cage 195, valve seat 179 and plate 175 are coupled such that the innermost annular protrusion of the valve seat 189 is captured between the annular flange 183 and cage inner peripheral surface 186. Accordingly, the innermost annular protrusion 189 extends partially into the flow passage 182, the importance of which will be discussed further below.

The cage 195 preferably includes a trap 196 located on the opposite side of cage 195 from the groove 193. The trap 196 preferably has a tri-spoke configuration that extends across the flow passage 182. It will be appreciated that this is merely exemplary and that instead of a spoke configuration, the trap 196 can be, for instance, a lattice-structure, cross-structure or any other configuration able to position the valve element 177 between cage 195 and the valve seat 179. When the cage 195 is coupled to the valve seat 179, a clearance 187 is provided between the cage 195, more specifically, the trap 196, and the innermost annular protrusion 189, within which valve element 177 is disposed. The trap 196 prevents misalignment of the valve element 177 within the flow passage 182, while still allowing fluids or gases to pass through the flow passage 182. It will be appreciated that the trap 196 can also be formed from a separate piece of material than the cage 195, and for example, can be coupled or fixed to or mounted on the cage 195. Preferably, the trap 196 further includes a stop protrusion 198 that extends from the center of the trap 196, into the flow passage 182 to prevent capillary attraction of the valve element 179 to the cage portion 195 and to also limit the distance of axial translation of the valve element 179. The stop protrusion 198 can be formed on or fixed to the trap 196. The protrusion 198 is preferably adjustable so that the clearance 187 between the cage 195 and valve element 177 can be adjusted. Alternatively, the stop protrusion 198 may be formed on the valve element concave surface 197.

Referring back to FIG. 3, the valve element 177 is preferably a concave disk having concave and convex surfaces 197, 199. The valve element 177 is positioned within the clearance 187 such that concave surface 197 communicates with gearbox 171, while convex surface 199 is positioned toward the ATS 100. The diameter of the valve element 177 is slightly greater than the diameter of the valve seat channel 180b and the valve body channel 180a such that the valve element outer peripheral surface 201 can contact the innermost annular protrusion 189 when axially translating between the cage 195 and the valve seat 179, and while maintaining position within the clearance 187. The valve element 177 preferably has a relatively small mass and is preferably made of plastic, or any other materials such as very thin metallic materials or ceramics, such as silicon nitride or silicon carbide, or any one of numerous other materials having a low density property. The valve element 177 is preferably configured such that it has a relatively low inertia with a relatively large surface area to enhance sealing response to the low differential pressures between the ATS 100 and gearbox 171. Additionally, it is preferable that the axis is aligned such that gravity assists the seating of the valve element 177, however, the axis of the valve element 177 can be at any orientation relative to gravity, such as horizontal as shown in the figures. Moreover, although the valve element 177 is depicted herein as having a concave shape, it will be understood, that the valve element 177 can have any one of numerous other shapes such as, for example, elliptical or flat.

Turning to FIG. 3, the check valve assembly 173 is shown during normal operation. In this embodiment, normal operation refers to an instance during which the pressure differential between the ATS 100 and gearbox 171 is about 0 psi. In a time of normal operation, almost no pressure differential exists between the ATS 100 and gearbox 171 sides of the flow passage 182, thus allowing the valve element 177 to freely translate axially within the clearance space 187. The relatively large diameter of the flow passage 182 allows oil and/or air to pass around the outer periphery of the valve element 201, as indicated by arrows 203. Meanwhile, the valve element 177 freely floats within clearance 187. Consequently, oil and/or air passes between the ATS 100 and gearbox 171 with little to no restriction.

However, in the event of ATS 100 puncture, the check valve assembly 173 seals the flow passage 182, preferably completely, such that oil and/or air preferably does not pass between the ATS 100 and gearbox 171, as illustrated in FIG. 4. During starter housing 102 breach, typically, the pressure in the ATS 100 drops below the pressure within the gearbox 171. The pressure differential is generally low and can be, for example, about 0.1–0.3 psig. As a result, a small relatively positive force is exerted on the valve element concave surface 197, while a small relatively negative force is exerted on the valve element convex surface 199. When this occurs, the outer peripheral surface of the valve element 201 contacts the innermost annular protrusion 189 of the valve seat 179. Because the valve seat 179 is made of relatively soft material, the innermost annular protrusion 189 deforms against the valve element 201 and forms a leak-tight seal to prevent flow of oil and/or air through flow passage 182. Alternatively, the smoothly ground configuration of valve seat 179 also permits sealing in the case of low differential pressures.

Thus, an aircraft turbine starter having improved fluid flow control in the condition of a starter housing puncture has been provided. Additionally, the air turbine starter provided includes the ability to operate during starter housing breach, and in particular, in instances when the breach causes a low pressure differential between the starter and gearbox.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A check valve assembly, comprising:
   a backing plate having an outlet port and an annular flange extending therefrom;
   a cage coupled to the backing plate, the cage having an inlet port, wherein a flow passage extends between the inlet port and the outlet port and an annular groove formed therein;
   a valve seat coupled between the backing plate and the cage, the valve seat extending at least partially into the flow passage and having an outer annular protrusion formed thereon, an opening therethrough, and an inner periphery, the outer annular protrusion disposed within the cage annular groove, and the inner periphery disposed under the plate annular flange; and
   a valve element disposed within the flow passage between the valve seat and the inlet port, the valve element configured to translate axially between an open position and a closed position in response to a pressure differential between the inlet and outlet ports.

2. The check valve assembly of claim 1, wherein the valve element includes a protrusion configured to selectively contact the at least one portion of the cage.

3. The check valve assembly of claim 1, wherein the at least one portion of the cage includes a protrusion configured to selectively contact the valve element.

4. The check valve assembly of claim 1, wherein the valve seat annular protrusion is disposed at least partially within the flow passage and sealingly couples to the valve element when the valve element is in the closed position.

5. The check valve assembly of claim 1, wherein the valve seat is elastomeric.

6. The check valve assembly of claim 1, wherein the valve seat is smoothly ground.

7. The check valve assembly of claim 1, wherein the valve element is made of a low density material.

8. A check valve assembly, comprising:
   a valve body having an inlet port, an outlet port, and a flow passage therebetween, the valve body comprising a backing plate and a cage, the backing plate including an annular flange extending therefrom, and the cage having at least a portion extending across the flow passage and an annular groove formed therein;
   a valve seat coupled to the valve body and disposed between the backing plate and the cage, the valve seat extending at least partially into the flow passage and having an outer annular protrusion formed thereon, an opening therethrough, and an inner periphery, the outer annular protrusion disposed within the cage annular groove, and the inner periphery disposed under the plate annular flange; and
   a valve element disposed within the flow passage between the valve seat and the valve body outlet port, the valve element configured to translate axially between an open position and a closed position in response to a pressure differential between the inlet and outlet ports.

9. The check valve assembly of claim 8, wherein the valve element includes a protrusion configured to selectively contact the at least one portion of the cage.

10. The check valve assembly of claim 8, wherein the at least one portion of the cage includes a protrusion configured to selectively contact the valve element.

11. The check valve assembly of claim 8, wherein the valve seat annular protrusion is disposed at least partially within the flow passage and sealingly couples to the valve element when the valve element is in the closed position.

12. The check valve assembly of claim 8, wherein the valve seat is elastomeric.

13. The check valve assembly of claim 8, wherein the valve seat is smoothly ground.

14. The check valve assembly of claim 8, wherein the valve element is made of a low density material.

15. An air turbine starter, comprising:
    a starter housing adapted to couple to a gearbox assembly, the starter housing including an opening configured to provide fluid communication between the gearbox assembly and the starter housing; and
    a check valve assembly disposed within the opening, the check valve assembly comprising:
      a valve body having an inlet port, an outlet port, and a flow passage therebetween, the valve body comprising a backing plate and a cage, the backing plate including an annular flange extending therefrom, and the cage having at least a portion extending across the flow passage and an annular groove formed therein;
      a valve seat coupled to the valve body and disposed between the backing plate and the cage, the valve seat extending at least partially into the flow passage and having an outer annular protrusion formed thereon, an opening therethrough, and an inner periphery, the outer annular protrusion disposed within the cage annular groove, and the inner periphery disposed under the plate annular flange; and
      a valve element disposed within the flow passage between the valve seat and the valve body outlet port, the valve element configured to translate axially between an open position and a closed position in response to a pressure differential between the inlet and outlet ports.

16. The air turbine starter of claim 15, wherein the valve element includes a protrusion extending from a surface thereof and configured to selectively contact the at least one portion of the cage.

17. The air turbine starter of claim 15, wherein the at least one portion of the cage includes a protrusion extending from a surface thereof and configured to selectively contact the valve element.

18. The air turbine starter of claim 15, wherein the valve seat annular protrusion is disposed at least partially within the flow passage and sealingly couples to the valve element when the valve element is in the closed position.

19. The air turbine starter of claim 15, wherein the valve seat is elastomeric.

20. The air turbine starter of claim 15, wherein the valve seat is smoothly ground.

21. The air turbine starter of claim 15, wherein the valve element is made of a low density material.

* * * * *